(12) United States Patent
Liubakka

(10) Patent No.: US 10,840,683 B1
(45) Date of Patent: Nov. 17, 2020

(54) ELECTRICAL CONDUIT COUPLING SYSTEM

(71) Applicant: Glenn Liubakka, Andover, MN (US)

(72) Inventor: Glenn Liubakka, Andover, MN (US)

(73) Assignee: NORTHEAST ENTREPRENEUR FUND, INC., Duluth, MN (US)

( * ) Notice: Subject to any disclaimer, the term of this patent is extended or adjusted under 35 U.S.C. 154(b) by 529 days.

(21) Appl. No.: 15/496,971

(22) Filed: Apr. 25, 2017

Related U.S. Application Data

(60) Provisional application No. 62/326,974, filed on Apr. 25, 2016.

(51) Int. Cl.
*H02G 3/06* (2006.01)
*H02G 3/04* (2006.01)
*F16L 5/02* (2006.01)
*F16L 47/06* (2006.01)
*F16L 37/02* (2006.01)

(52) U.S. Cl.
CPC ............ *H02G 3/0481* (2013.01); *F16L 5/027* (2013.01); *F16L 37/02* (2013.01); *F16L 47/06* (2013.01); *H02G 3/06* (2013.01)

(58) Field of Classification Search
CPC ...... H02G 3/0481; H02G 3/06; H02G 3/0616; H02G 3/125; H02G 3/126; H02G 3/22; F16L 5/027
See application file for complete search history.

(56) References Cited

U.S. PATENT DOCUMENTS

| | | | | |
|---|---|---|---|---|
| 2,900,436 A | * | 8/1959 | Appleton | H02G 3/06 174/86 |
| 3,285,551 A | * | 11/1966 | Tschanz | H02G 3/065 248/56 |
| 3,684,220 A | * | 8/1972 | Logsdon | F16L 5/00 248/56 |
| 3,918,667 A | * | 11/1975 | Madden | F16L 5/00 248/56 |
| 3,979,093 A | * | 9/1976 | Madden | F16L 5/00 248/56 |
| 4,237,667 A | * | 12/1980 | Pallucci | E04B 1/6812 248/56 |
| 4,440,425 A | * | 4/1984 | Pate | H02G 3/0616 285/149.1 |
| 4,711,472 A | * | 12/1987 | Schnell | H02G 3/06 174/153 G |
| 5,090,644 A | * | 2/1992 | Lenker | F16L 5/00 174/153 G |
| 5,132,493 A | * | 7/1992 | Sheehan | H02G 3/06 174/655 |
| 5,204,499 A | | 4/1993 | Favalora | |
| 5,248,850 A | * | 9/1993 | Laney | H02G 3/0616 174/51 |

(Continued)

*Primary Examiner* — David Bochna
(74) *Attorney, Agent, or Firm* — Billion & Armitage; Richard E. Billion

(57) ABSTRACT

A stud wire protector includes: a first hollow cylindrical and a second hollow cylindrical member. Methods of inserting the stud wire protector are also provided. The stud-wire protector is also part of an electrical conduit coupling system. The electrical conduit coupling system includes: two or more stud wire protectors and two or more conduit couplers. Methods of attaching the electrical conduit coupling system to two or more studs are also provided.

19 Claims, 13 Drawing Sheets

(56) References Cited

U.S. PATENT DOCUMENTS

| | | | | |
|---|---|---|---|---|
| 5,383,688 A * | 1/1995 | Berry | ............... | H02G 3/06 |
| | | | | 174/83 |
| 5,456,050 A * | 10/1995 | Ward | ............... | A62C 2/065 |
| | | | | 52/1 |
| 5,594,202 A * | 1/1997 | Tobias | ............... | H02G 3/22 |
| | | | | 174/505 |
| 5,866,853 A * | 2/1999 | Sheehan | ............... | H02G 3/0675 |
| | | | | 174/153 R |
| 6,179,340 B1 * | 1/2001 | Adolf | ............... | H02G 3/0625 |
| | | | | 285/140.1 |
| 6,241,199 B1 * | 6/2001 | Ismert | ............... | F16L 59/024 |
| | | | | 248/56 |
| 6,511,099 B2 * | 1/2003 | Bartholoma | ............... | H02G 3/065 |
| | | | | 174/151 |
| 6,521,833 B1 | 2/2003 | DeFreitas | | |
| 6,530,187 B2 * | 3/2003 | Shimizu | ............... | F16L 5/02 |
| | | | | 52/220.1 |
| 6,725,788 B2 * | 4/2004 | McCartney | ............... | A01C 7/042 |
| | | | | 111/175 |
| 6,752,361 B2 * | 6/2004 | Chou | ............... | F16L 3/1226 |
| | | | | 248/74.1 |
| 7,214,890 B2 * | 5/2007 | Kiely | ............... | H02G 3/0691 |
| | | | | 174/659 |
| 7,390,980 B1 * | 6/2008 | Gretz | ............... | H02G 3/06 |
| | | | | 16/2.1 |
| 8,415,571 B2 * | 4/2013 | Kiely | ............... | H01R 13/74 |
| | | | | 174/669 |
| 8,424,267 B2 * | 4/2013 | Cannistraro | ............... | E04F 21/00 |
| | | | | 52/220.1 |
| 9,705,295 B1 * | 7/2017 | Smith | ............... | H02G 3/0481 |
| 9,835,276 B2 * | 12/2017 | Wu | ............... | F16L 37/08 |
| 10,269,473 B1 * | 4/2019 | Gretz | ............... | H02G 3/06 |
| 2006/0054340 A1 * | 3/2006 | Auray | ............... | H02G 3/0691 |
| | | | | 174/650 |
| 2009/0178845 A1 * | 7/2009 | Auray | ............... | H02G 3/0691 |
| | | | | 174/666 |
| 2009/0236848 A1 * | 9/2009 | Foreman | ............... | F16L 5/027 |
| | | | | 285/64 |

* cited by examiner

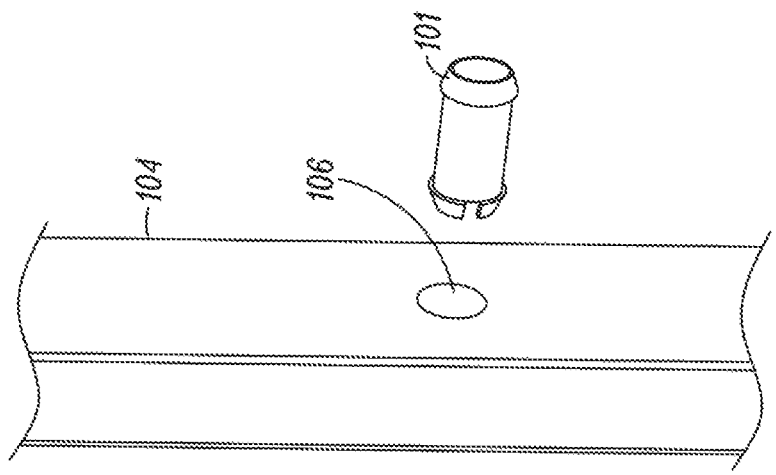
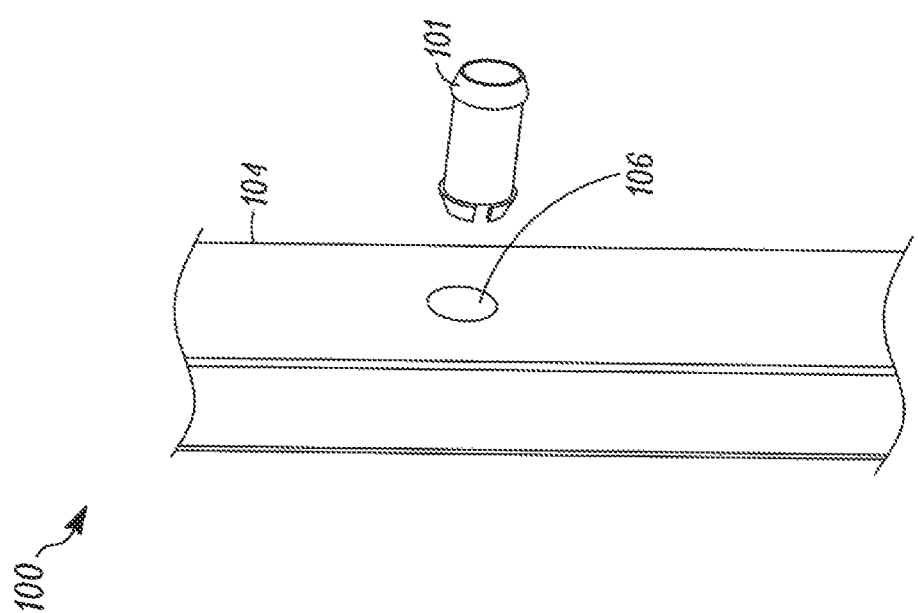
FIG. 4

ELECTRICAL CONDUIT COUPLING SYSTEM

RELATED APPLICATIONS

This application claims priority to U.S. Provisional Patent Application Ser. No. 62/326,974 filed Apr. 26, 2017, which is hereby incorporated by reference in its entirety for all purposes.

BACKGROUND OF THE INVENTION

The electrical wiring in a structure is protected from moisture, flammable gas, chemical vapors, impact, and the like by being placed in electrical conduit. Electrical conduit has many diameters and is typically made from metal (e.g., steel, aluminum, etc) or plastics (e.g., polyvinyl chloride (PVC), etc). Local building codes and the U.S. National Electrical Code (NEC) specify the form and installation details for electrical conduit.

Current conduit systems, however, are cumbersome to install and require the use of tools. What is needed is a simple and fast method of protecting wires traveling through studs for installing complete systems of electrical conduit without the use of tools.

SUMMARY OF THE INVENTION

The present invention provides a stud wire protector. The stud wire protector includes: a first hollow cylindrical and a second hollow cylindrical member. Methods of inserting the stud wire protector are also provided.

The present invention also provides an electrical conduit coupling system. The electrical conduit coupling system includes: two or more stud wire protectors and two or more conduit couplers. Methods of attaching the electrical conduit coupling system to two or more studs are also provided.

The stud wire protector provides protection of the wires passing therein from external damage from nails, screws, drills, and the like to prevent potential arc fault conditions. It provides a smooth surface to ease the process of pulling wire through which also protects wire from scrapes during the installation process.

The electrical conduit coupling system provides a simple and fast way for a user to insert electrical conduit in a structure without the use of tools. The electrical conduit coupling system comes in multiple sizes to accommodate all sizes of conduit.

The present invention provides a stud wire protector. The stud wire protector includes: a first hollow cylindrical member having a proximal end, a distal end, and configured to extend through and not beyond a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, and wherein second fitting is configured to extend beyond distal end of the first hollow cylindrical member.

In one embodiment, the first fitting is a press-fitting. In one embodiment, the first fitting is a tapered press-fitting. In one embodiment, the second fitting is a tapered fitting. In one embodiment, the second hollow cylindrical member has one or more indentations around the circumference at the proximal end.

The present invention provides a stud wire protector. The stud wire protector includes: a first hollow cylindrical member having a proximal end, a distal end, and configured to extend through and not beyond a stud; a second hollow cylindrical member having a first press-fitting at a proximal end and a second fitting at a distal end; wherein the second hollow cylindrical member is configured to fit within the first hollow cylindrical member, wherein the first press-fitting is configured to insert within and to extend beyond the proximal end of the first hollow cylindrical member, and wherein second fitting is configured to extend beyond distal end of the first hollow cylindrical member.

In one embodiment, the first fitting is a tapered press-fitting. In one embodiment, the second fitting is a tapered fitting. In one embodiment, the second hollow cylindrical member has one or more indentations around the circumference at the proximal end.

The present invention provides a stud wire protector. The stud wire protector includes: a first hollow cylindrical member having a proximal end, a distal end, and configured to extend through and not beyond a stud; a second hollow cylindrical member having a first tapered press-fitting at a proximal end and a second tapered fitting at a distal end; wherein the second hollow cylindrical member is configured to fit within the first hollow cylindrical member, wherein the first tapered press-fitting is configured to insert within and to extend beyond the proximal end of the first hollow cylindrical member, and wherein second tapered fitting is configured to extend beyond distal end of the first hollow cylindrical member. In one embodiment, the second hollow cylindrical member has one or more indentations around the circumference at the proximal end.

The present invention provides a method of attaching stud wire protector to a stud, the method includes: providing a stud wire protector comprising: a first hollow cylindrical member having a proximal end, a distal end, and configured to extend through a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member; and inserting and securing the stud wire protector into a pre-drilled hole in a stud.

The present invention provides an electrical conduit coupling system. The electrical conduit coupling system includes: two or more stud wire protectors each independently including: a first hollow cylindrical member having a proximal end, a distal end, and configured to extend through and not beyond a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member; two or more conduit couplers each having a proximal end and a distal end, wherein the two or more conduit couplers are each independently configured at each proximal end to accept the first fitting and the second fitting, and wherein the two or more conduit couplers are configured at each distal end to accept a spring and an end of electrical conduit.

In one embodiment, the first fitting is a press-fitting. In one embodiment, the first fitting is a tapered press-fitting. In one embodiment, the tapered press-fitting has a proximal end with a diameter less than a diameter of a distal end. In one embodiment, the second fitting is a tapered fitting. In one embodiment, the tapered fitting has a proximal end with a diameter greater than a diameter of a distal end. In one embodiment, the second hollow cylindrical member has one or more indentations around the circumference at the proximal end to the interior to allow for the proximal end of the second hollow cylindrical member to contract when the second hollow cylindrical member is inserted into the first hollow cylindrical member. In one embodiment, the two or more conduit couplers each independently comprise an internal cavity at the proximal end that accepts the exterior of the first fitting and the second fitting. In one embodiment, the two or more conduit couplers each independently comprise a tapered internal cavity at the proximal end that accepts a tapered exterior of the first fitting and the second fitting. In one embodiment, the two or more conduit couplers each independently comprise a circular cavity at the distal end that accepts a spring and an end of electrical conduit. In one embodiment, the electrical conduit is polyvinyl chloride (PVC) electrical conduit.

The present invention provides an electrical conduit coupling system. The electrical conduit coupling system includes: two or more stud wire protectors each independently including: a first hollow cylindrical member having a proximal end, a distal end, and configured to extend through and not beyond a stud; a second hollow cylindrical member having a first press-fitting at a proximal end and a second fitting at a distal end; wherein the second hollow cylindrical member is configured to fit within the first hollow cylindrical member, wherein the first press-fitting is configured to insert within and to extend beyond the proximal end of the first hollow cylindrical member, wherein second fitting is configured to extend beyond distal end of the first hollow cylindrical member; two or more conduit couplers each having a proximal end and a distal end, wherein the two or more conduit couplers are each independently configured at each proximal end to accept the first press-fitting and the second fitting, and wherein the two or more conduit couplers are configured at each distal end to accept a spring and an end of electrical conduit.

In one embodiment, the first press-fitting is a tapered press-fitting. In one embodiment, the tapered press-fitting has a proximal end with a diameter less than a diameter of a distal end. In one embodiment, the second fitting is a tapered fitting. In one embodiment, the tapered fitting has a proximal end with a diameter greater than a diameter of a distal end. In one embodiment, the second hollow cylindrical member has one or more indentations around the circumference at the proximal end to the interior to allow for the proximal end of the second hollow cylindrical member to contract when the second hollow cylindrical member is inserted into the first hollow cylindrical member. In one embodiment, the two or more conduit couplers each independently comprise an internal cavity at the proximal end that accepts the exterior of the first press-fitting and the second fitting. In one embodiment, the two or more conduit couplers each independently comprise a tapered internal cavity at the proximal end that accepts a tapered exterior of the first press-fitting and the second fitting. In one embodiment, the two or more conduit couplers each independently comprise a circular cavity at the distal end that accepts a spring and an end of electrical conduit. In one embodiment, the electrical conduit is polyvinyl chloride (PVC) electrical conduit.

The present invention provides an electrical conduit coupling system. The electrical conduit coupling system includes: two or more stud wire protectors each independently including: a first hollow cylindrical member having a proximal end, a distal end, and configured to extend through and not beyond a stud; a second hollow cylindrical member having a first tapered press-fitting at a proximal end and a second tapered fitting at a distal end; wherein the second hollow cylindrical member is configured to fit within the first hollow cylindrical member, wherein the first tapered press-fitting is configured to insert within and to extend beyond the proximal end of the first hollow cylindrical member, wherein second tapered fitting is configured to extend beyond distal end of the first hollow cylindrical member; two or more conduit couplers each having a proximal end and a distal end, wherein the two or more conduit couplers are each independently configured at each proximal end to accept the first tapered press-fitting and the second tapered fitting, and wherein the two or more conduit couplers are configured at each distal end to accept a spring and an end of polyvinyl chloride (PVC) electrical conduit.

In one embodiment, the first tapered press-fitting has a proximal end with a diameter less than a diameter of a distal end. In one embodiment, the second tapered fitting has a proximal end with a diameter greater than a diameter of a distal end. In one embodiment, the second hollow cylindrical member has one or more indentations around the circumference at the proximal end to the interior to allow for the proximal end of the second hollow cylindrical member to contract when the second hollow cylindrical member is inserted into the first hollow cylindrical member. In one embodiment, the two or more conduit couplers each independently comprise an internal cavity at the proximal end that accepts the exterior of the first tapered press-fitting and the second tapered fitting. In one embodiment, the two or more conduit couplers each independently comprise a tapered internal cavity at the proximal end that accepts the tapered exterior of the first tapered press-fitting and the second tapered fitting. In one embodiment, the two or more conduit couplers each independently comprise a circular cavity at the distal end that accepts a spring and an end of polyvinyl chloride (PVC) electrical conduit. In one embodiment, the first hollow cylindrical member, the second hollow cylindrical member, the two or more conduit couplers, or a combination thereof each independently comprise polyvinyl chloride (PVC).

The present invention provides a method of attaching an electrical conduit coupling system to two or more studs. The method includes: providing an electrical conduit coupling system including: two or more stud wire protectors each independently including: a first hollow cylindrical member having a proximal end, a distal end, and configured to extend through and not beyond a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member; two or more conduit couplers each having a proximal end and a distal end, wherein the two or more conduit couplers are each independently configured at each proximal end to accept the first fitting and the second fitting, wherein the two or more conduit couplers are configured at each distal end to accept a spring and an end of electrical conduit; inserting and securing the two or more stud wire protectors into two or more pre-drilled holes in two or more adjacent studs; inserting two or more springs into each of the distal ends of two or more conduit couplers; inserting each end of an electrical conduit into the distal ends of two or more conduit couplers that each contain a spring to provide an electrical conduit assembly; attaching a first end of the electrical conduit assembly to a first stud fitting secured in a first stud; and attaching a second end of the electrical conduit assembly to a second stud fitting secured in a second stud.

The present invention provides a method of attaching an electrical conduit coupling system to two or more studs. The method includes: providing a polyvinyl chloride (PVC) electrical conduit coupling system including: two or more stud wire protectors each independently including: a first hollow cylindrical member having a proximal end, a distal end, and configured to extend through and not beyond a stud; a second hollow cylindrical member having a first fitting at a proximal end and a second fitting at a distal end; wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member; two or more conduit couplers each having a proximal end and a distal end, wherein the two or more conduit couplers are each independently configured at each proximal end to accept the first fitting and the second fitting, wherein the two or more conduit couplers are configured at each distal end to accept a spring and an end of electrical conduit; inserting and securing the two or more stud wire protectors into two or more pre-drilled holes in two or more adjacent studs: inserting two or more springs into each of the distal ends of two or more conduit couplers; inserting each end of a polyvinyl chloride (PVC) electrical conduit into the distal ends of two or more conduit couplers that each contain a spring to provide a polyvinyl chloride (PVC) electrical conduit assembly; attaching a first end of the polyvinyl chloride (PVC) electrical conduit assembly to a first stud fitting secured in a first stud; and attaching a second end of the polyvinyl chloride (PVC) electrical conduit assembly to a second stud fitting secured in a second stud.

BRIEF DESCRIPTION OF THE DRAWINGS

Embodiments of the invention may be best understood by referring to the following description and accompanying drawings, which illustrate such embodiments.

In the drawings:

FIG. 4 is a perspective drawing illustrating exemplary stud wire protectors and pre-drilled studs.

DETAILED DESCRIPTION OF THE INVENTION

Figure 1:
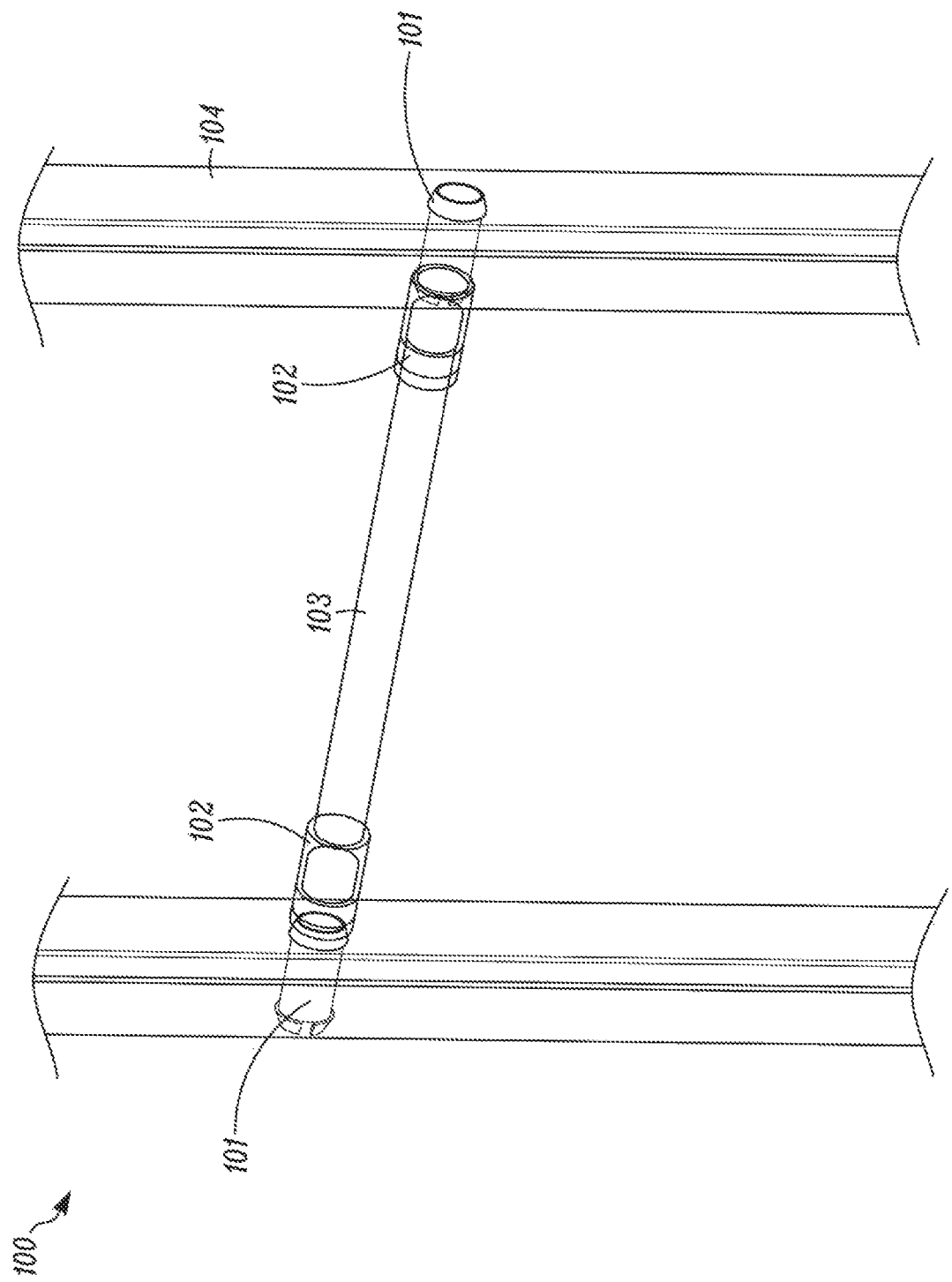
FIG. 1 is a perspective drawing illustrating an exemplary electrical conduit coupling system.

The present invention provides a stud wire protector. The stud wire protector includes: a first hollow cylindrical and a second hollow cylindrical member. Methods of inserting the stud wire protector are also provided.

The present invention also provides an electrical conduit coupling system. The electrical conduit coupling system includes: two or more stud wire protectors and two or more conduit couplers. Methods of attaching the electrical conduit coupling system to two or more studs are also provided.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the term "comprising" or "comprises" is intended to mean that the compositions and methods include the recited elements, but not excluding others.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the phrase "operatively coupled" refers to bringing two or more items together or into relationship with each other such that they may operate together or allow transfer of information between the two or more items.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "proximal" refers to the closest end of an object. In contrast, the term "distal" refers to the farthest end of an object.

As used herein, the terms "front," "back," "rear," "upper," "lower," "right," and "left" in this description are merely used to identify the various elements as they are oriented in the FIGS, with "front," "back," and "rear" being relative apparatus. These terms are not meant to limit the element which they describe, as the various elements may be oriented differently in various applications.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention illustratively disclosed herein suitably may be practiced in the absence of any element which is not specifically disclosed herein.

Figure 2:
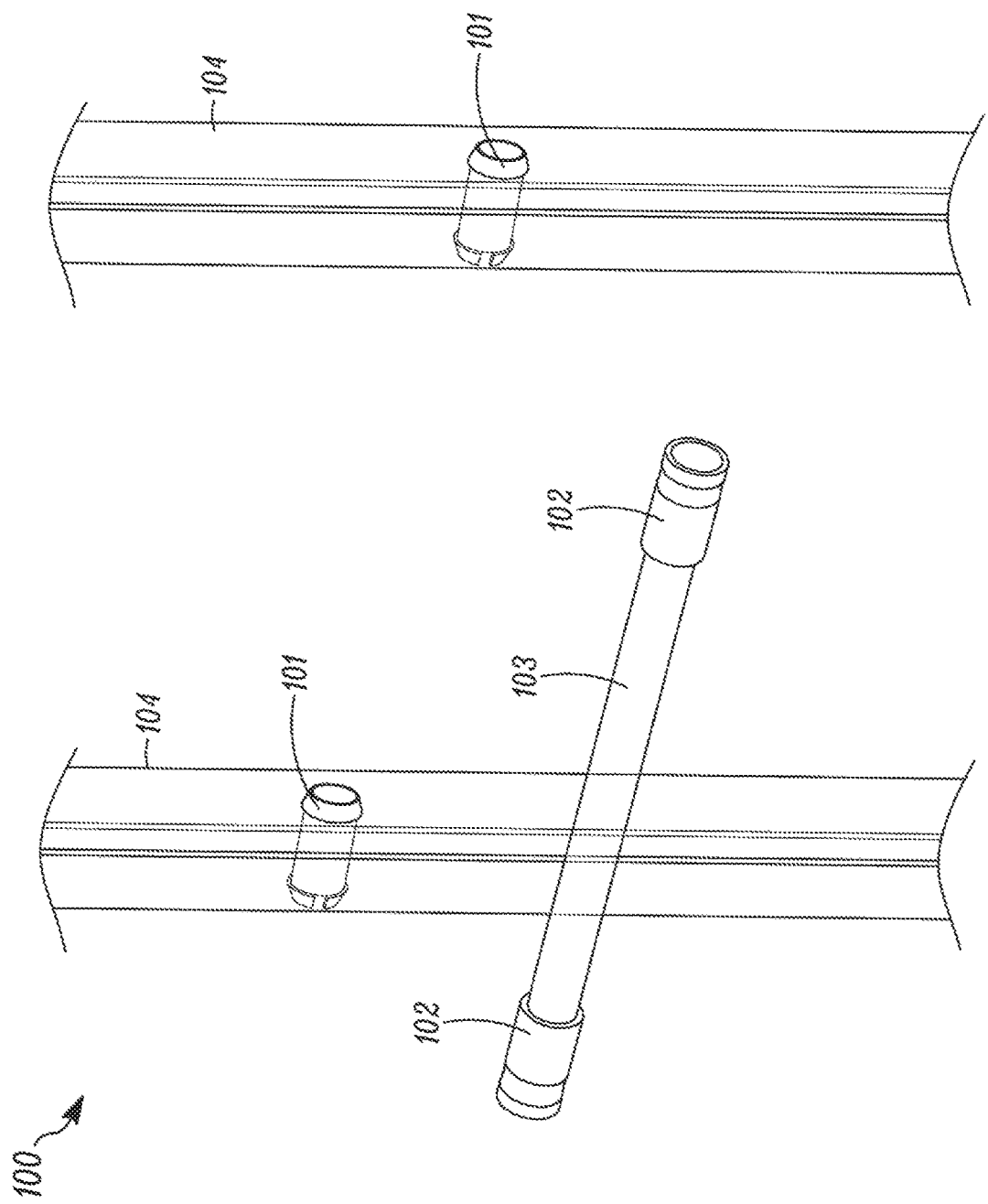
FIG. 2 is a perspective drawing illustrating an exemplary electrical conduit coupling system.
Figure 3:
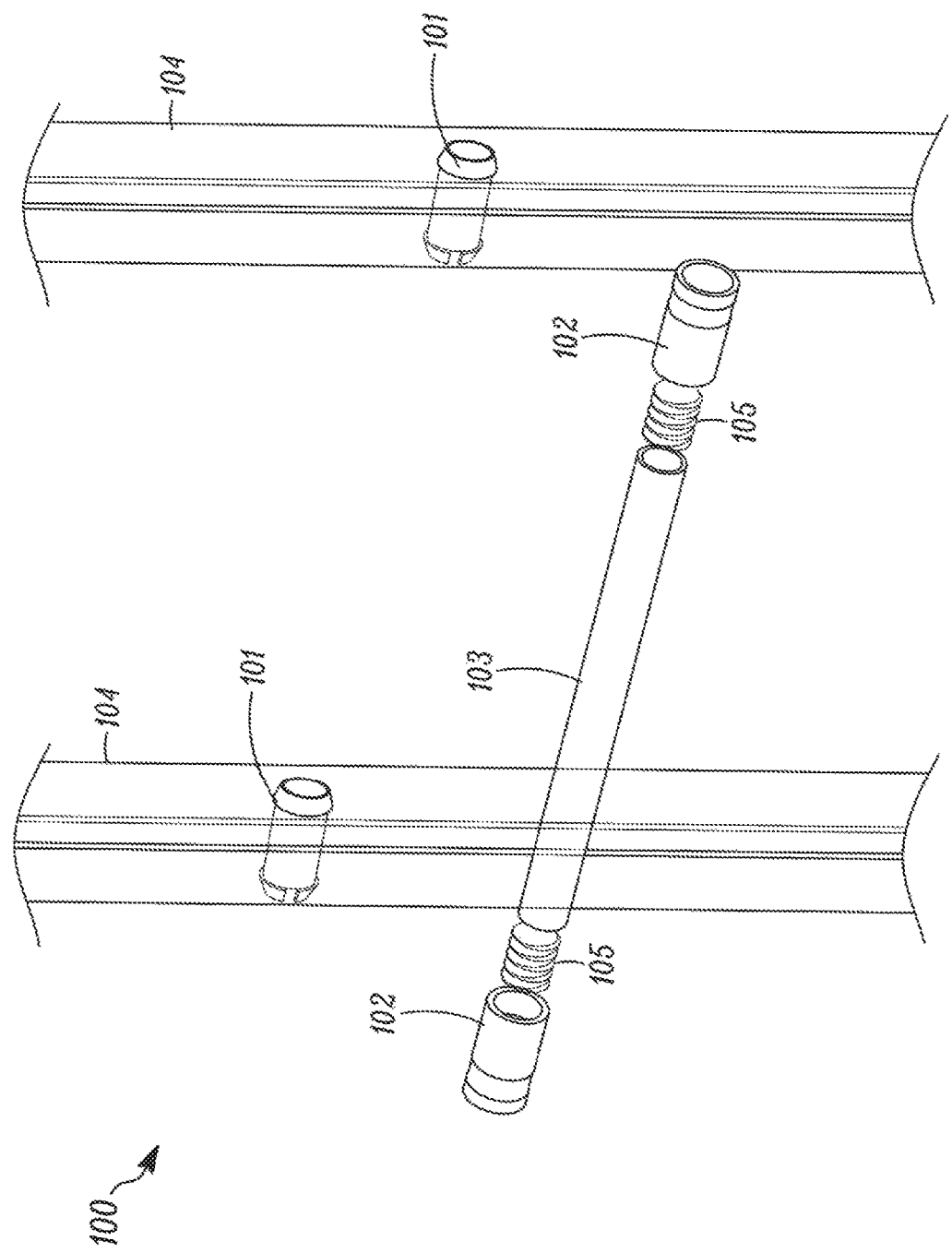
FIG. 3 is a perspective drawing illustrating an exemplary electrical conduit coupling system.
Figure 5:
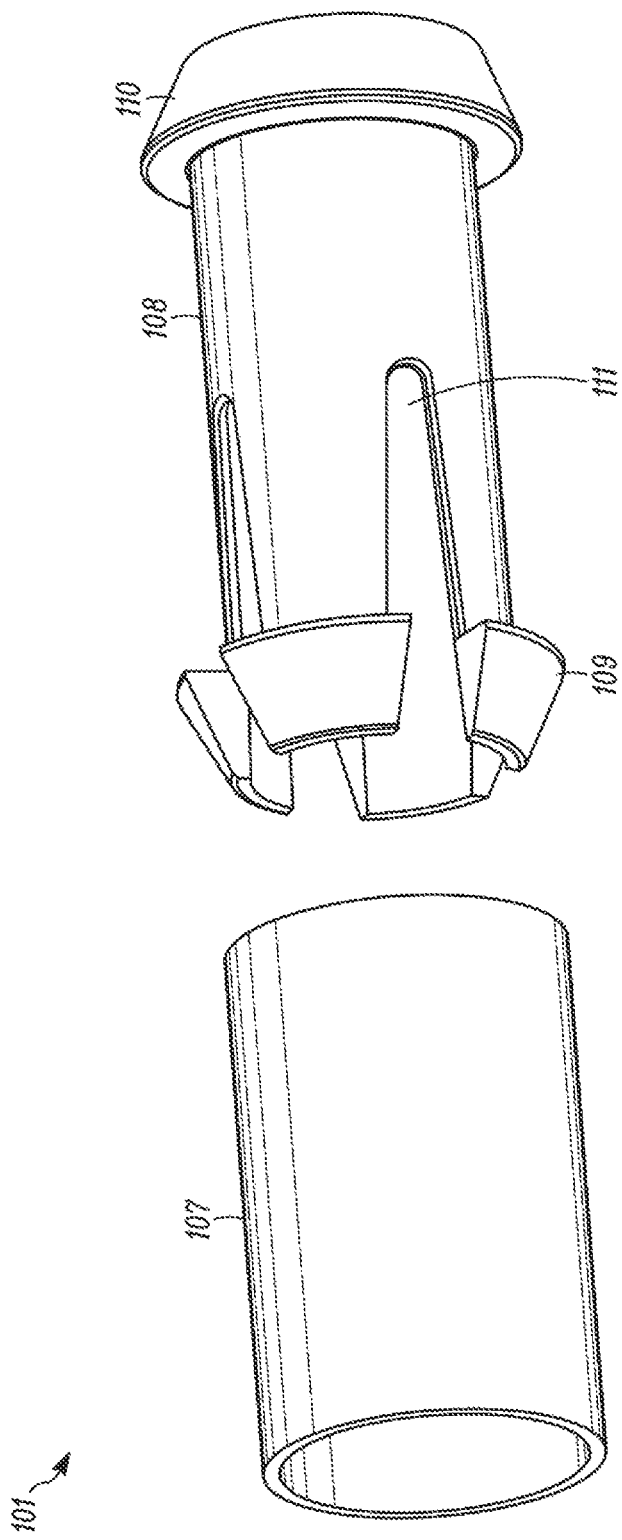
FIG. 5 is a perspective drawing illustrating an exemplary stud wire protector that includes a first hollow cylindrical member and a second hollow cylindrical member.
Figure 6:
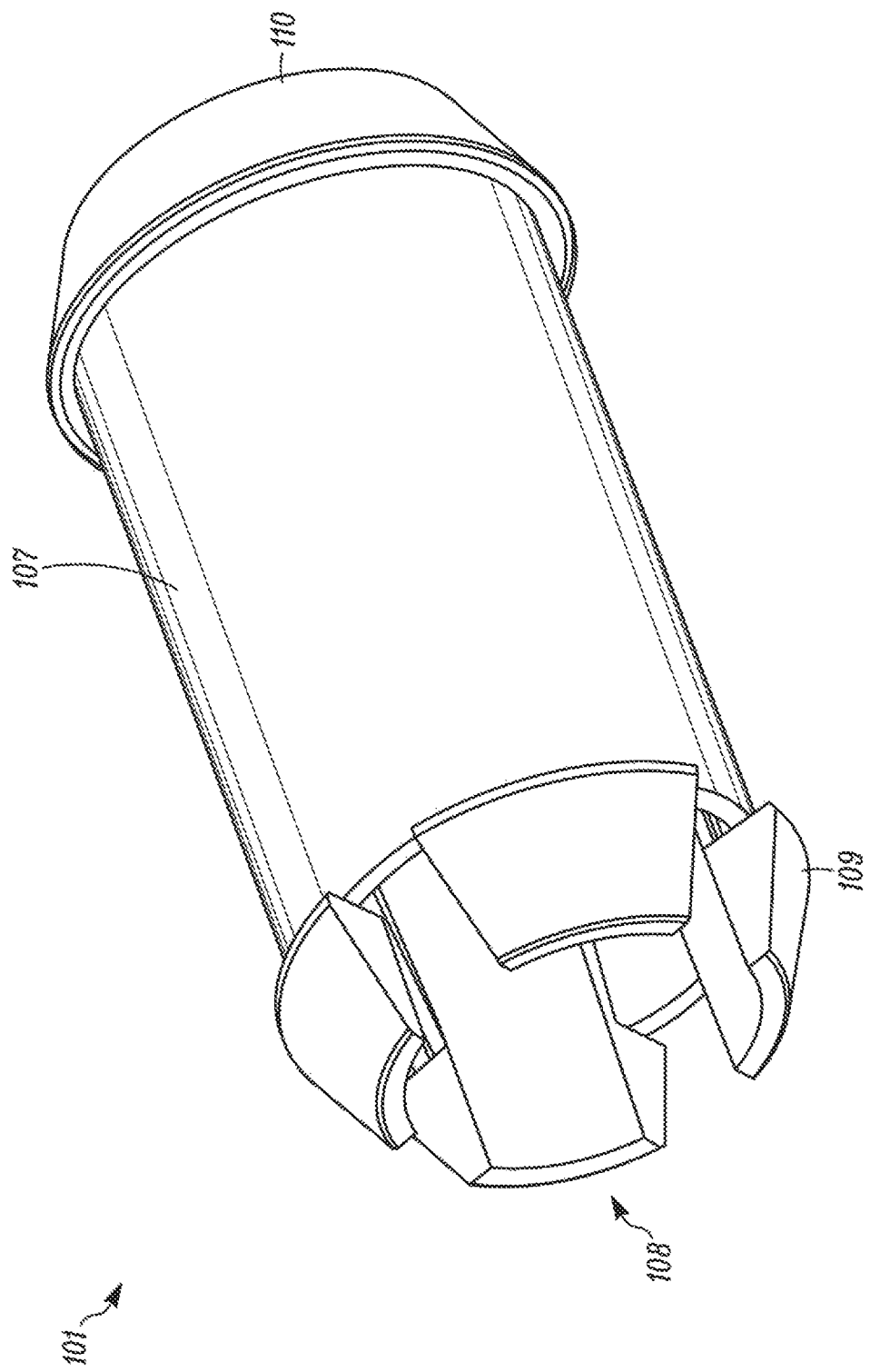
FIG. 6 is a perspective drawing illustrating an exemplary stud wire protector.
Figure 7:
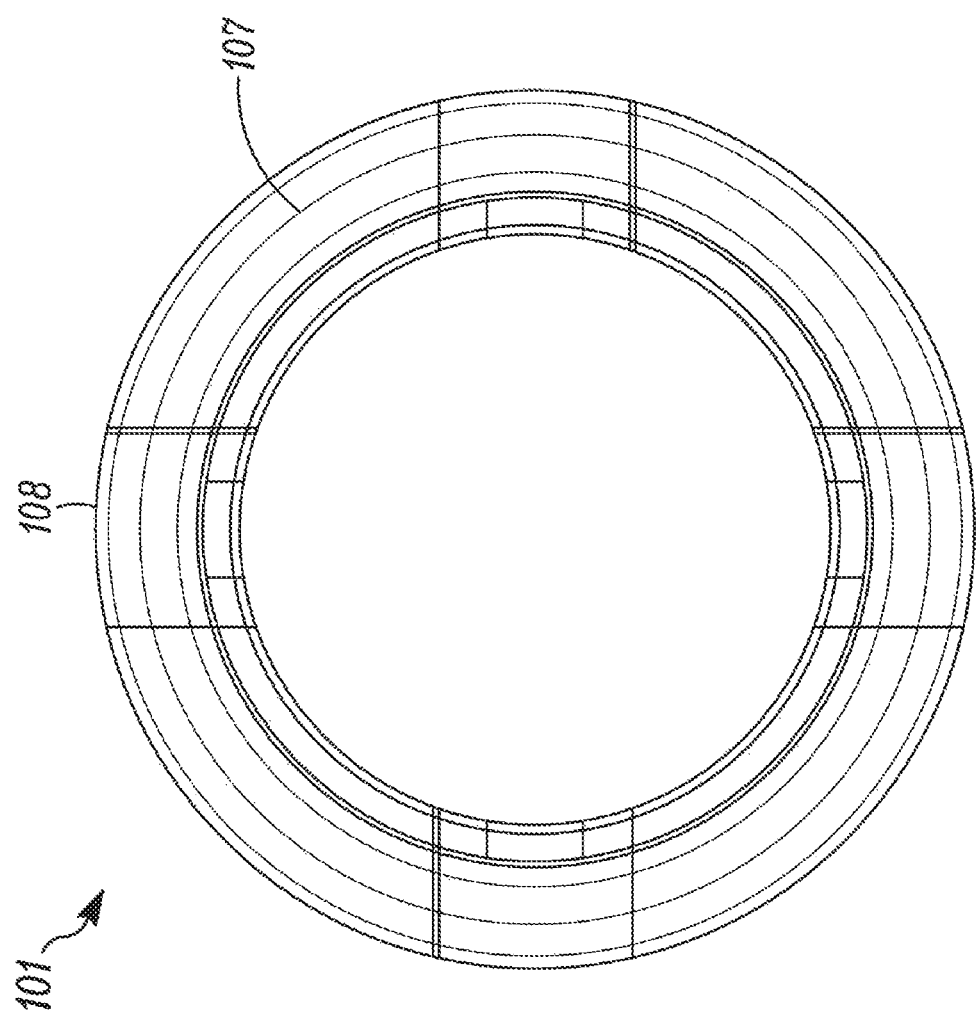
FIG. 7 is a bottom-view drawing illustrating an exemplary stud wire protector.
Figure 8:
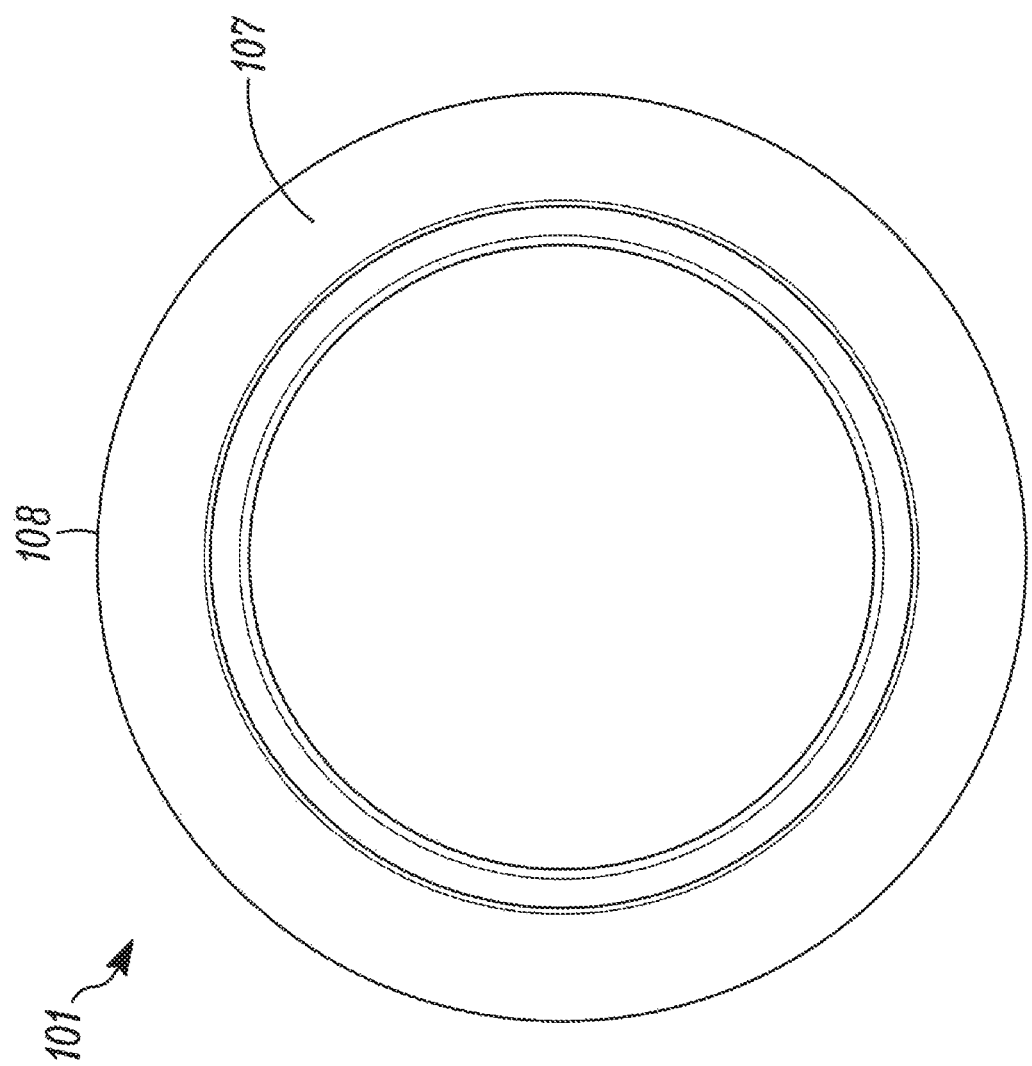
FIG. 8 is a top-view drawing illustrating an exemplary stud wire protector.
Figure 9:
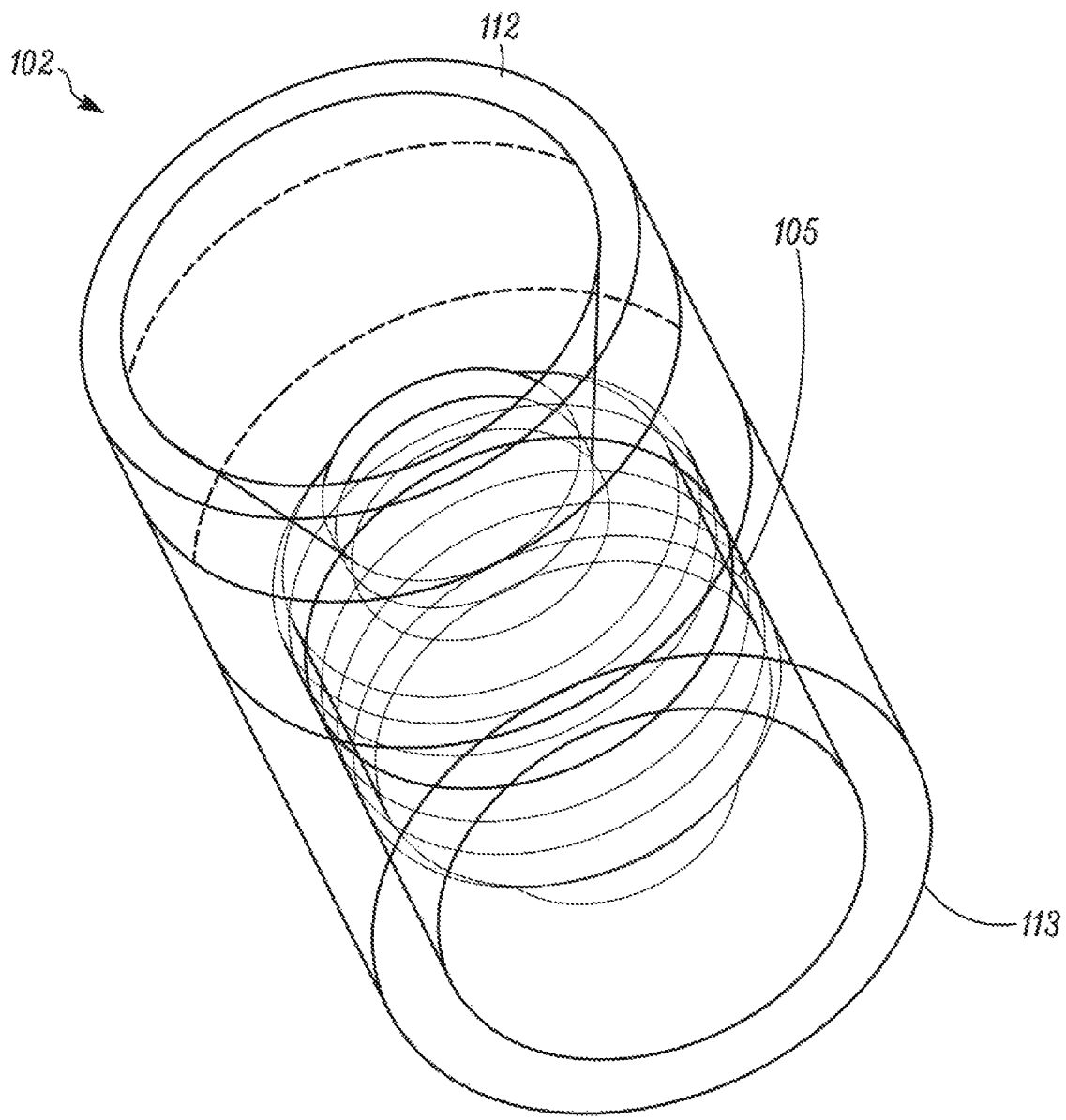
FIG. 9 is a perspective drawing illustrating an exemplary conduit coupler.
Figure 10:
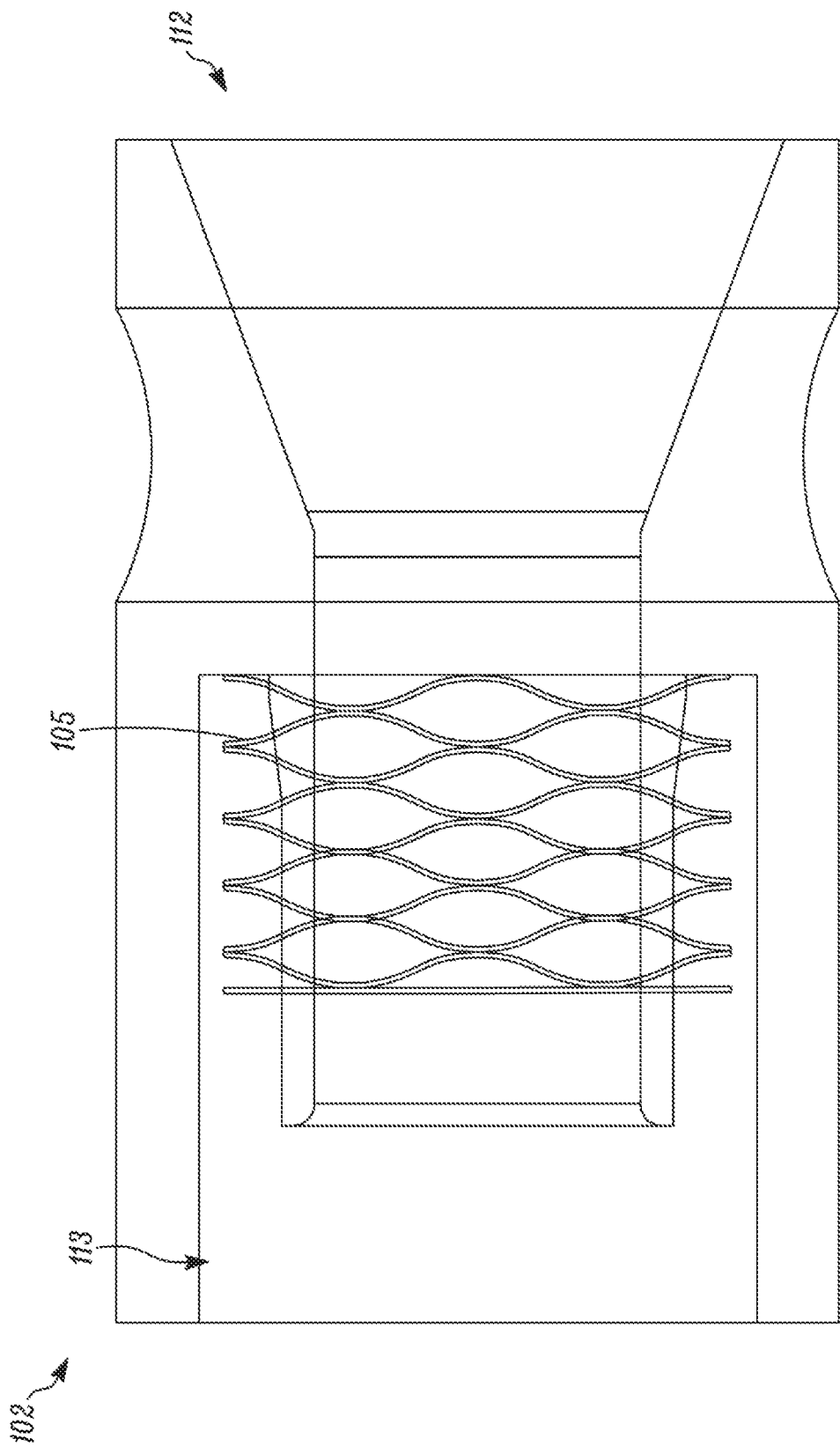
FIG. 10 is a side-view drawing illustrating an exemplary conduit coupler.
Figure 11:
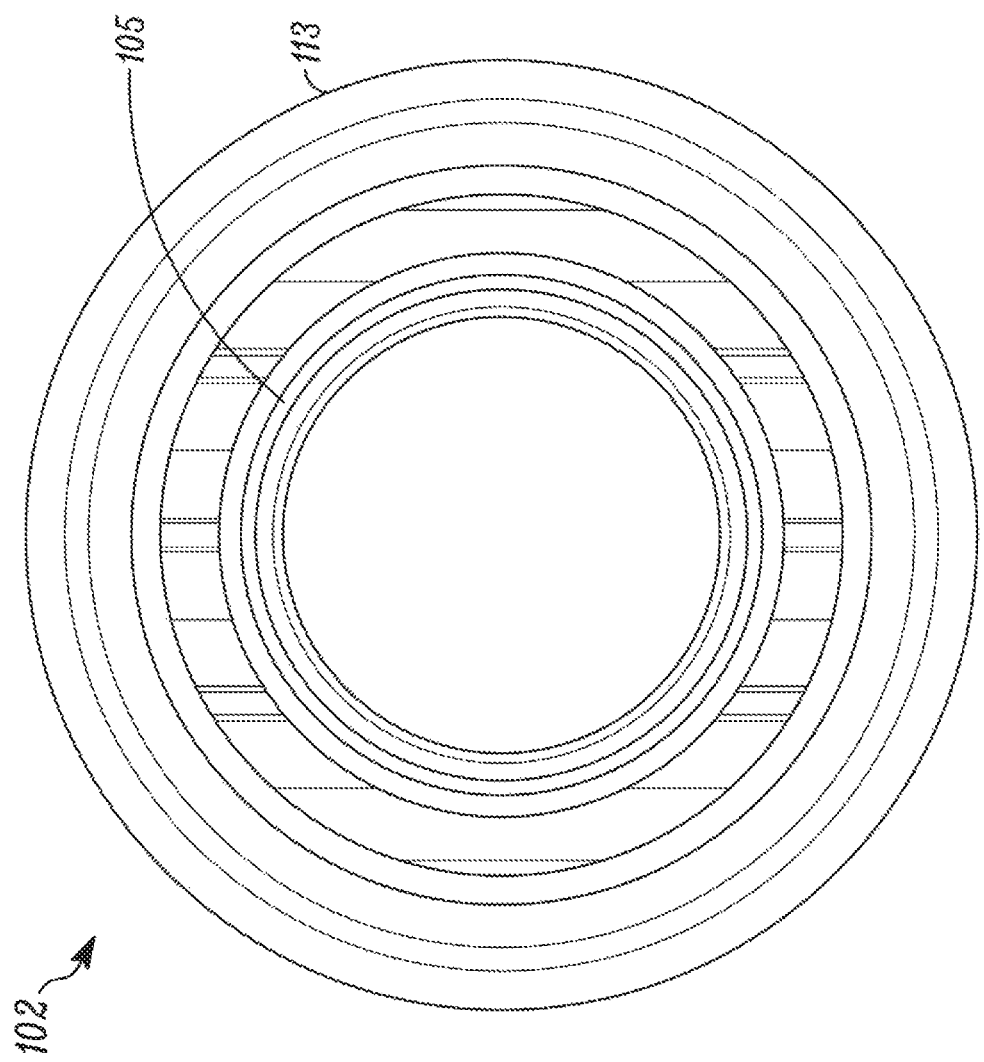
FIG. 11 is a bottom-view drawing illustrating an exemplary conduit coupler.
Figure 12:
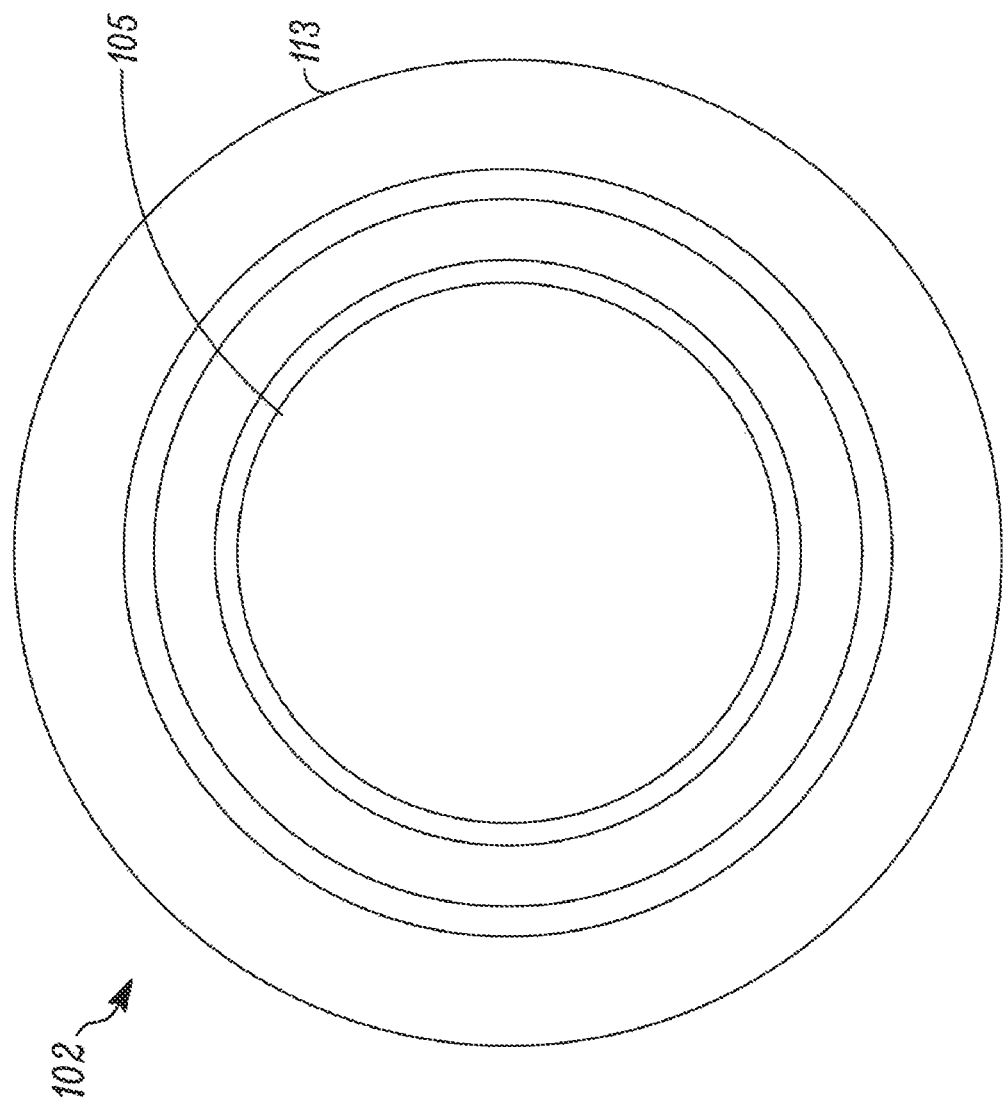
FIG. 12 is a top-view drawing illustrating an exemplary conduit coupler.
Figure 13:
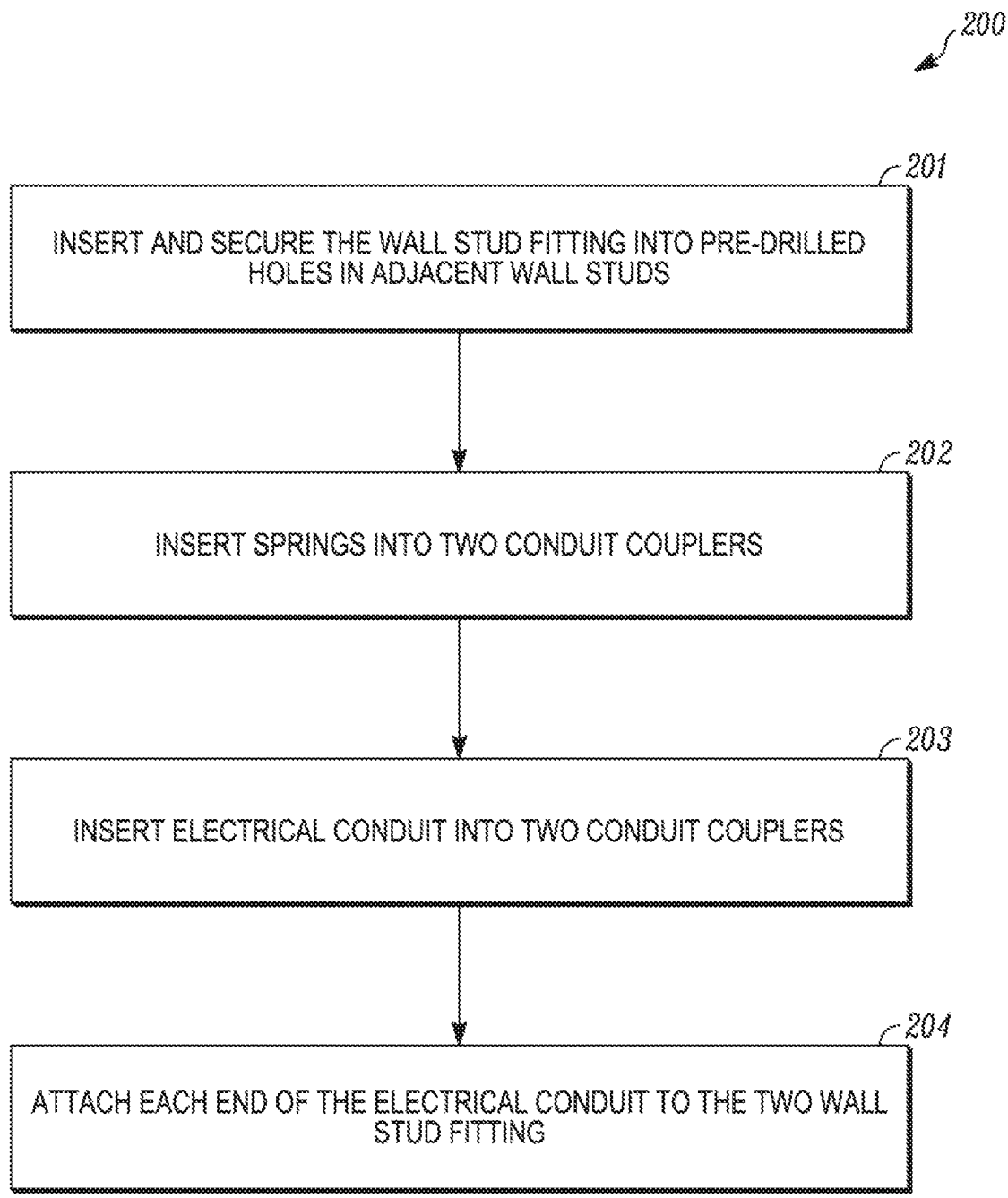
FIG. 13 is a block diagram illustrating an exemplary method of using an exemplary electrical conduit coupling system The drawings are not necessarily to scale. Like numbers used in the figures refer to like components, steps, and the like. However, it will be understood that the use of a number to refer to a component in a given figure is not intended to limit the component in another figure labeled with the same number.

FIGS. 1-3 are perspective drawings illustrating an exemplary electrical conduit coupling system 100. The electrical conduit coupling system 100 includes: two stud wire protectors 101 and two conduit couplers 102. The two stud wire protectors 101 are configured to extend through and not beyond the side of a stud 104. The two conduit couplers 102 each have a proximal end that is configured to accept both ends of the stud wire protectors 101. The distal end of the two conduit couplers 102 are configured with an internal cavity to accept a spring 105 followed by an end of electrical conduit 103.

To assemble the electrical conduit coupling system 100, the springs 105 are inserted into each of the cavities in the distal end of each of the two conduit couplers 102. The ends of a pre-cut piece of electrical conduit 103 are inserted into each of the two conduit couplers 102 containing springs 105 to provide a conduit assembly. Finally, the conduit assembly is compressed by the user (not shown) and each end is inserted into the ends of the wall fittings 101 in the studs 104. Once the conduit assembly is in place, the user (not shown) releases the tension on the conduit assembly and the conduit assembly fits snuggly into place. This process is continued until the electrical conduit for the room is in place. At that time, the electrical wires are inserted into the conduit.

To disassemble the electrical conduit coupling system 100, the user (not shown) compresses the conduit assembly, removes the conduit assembly from the structure, compresses the press-fitting on the proximal end of each of the wall fittings 101, and removes the wall fittings 101 from the studs 104.

FIG. 4 is a perspective drawing illustrating exemplary stud wire protectors 101 and studs 104 that contain pre-drilled holes 106. The wall fittings 101 are inserted with pressure into the pre-drilled holes 106 in the studs 104 so that both ends of the wall fittings 101 protrude from the surface of the studs 104.

FIGS. 5-8 are drawings illustrating an exemplary stud wire protector 101 that includes a first hollow cylindrical member 107 and a second hollow cylindrical member 108. The first hollow cylindrical member 107 has a proximal end, a distal end, and is configured to extend through and not beyond a stud (not shown). The second hollow cylindrical member 108 has a first fitting 109 at a proximal end and a second fitting 110 at a distal end. The second hollow cylindrical member 108 is configured to fit within the first hollow cylindrical member 107. The first fitting 109 is configured to insert within and to extend beyond the proximal end of the first hollow cylindrical member 107. The second fitting 110 is configured to extend beyond distal end of the first hollow cylindrical member 107 when the second hollow cylindrical member 108 is inserted into the first hollow cylindrical member 107.

In one embodiment, the first fitting 109 is a press-fitting. In one embodiment, the press-fitting is a tapered press-fitting as shown. In one embodiment, the second fitting 110 is a tapered fitting as shown. In one embodiment, the second hollow cylindrical member 108 has one or more indentations 111 that extend from the proximal end to the interior to allow for the proximal end of the second hollow cylindrical member 108 to contract when the second hollow cylindrical member 108 is inserted into the first hollow cylindrical member 107.

FIGS. 9-13 are various drawings illustrating an exemplary conduit coupler 102. The conduit coupler 102 includes a tapered internal cavity 112 at the proximal end that accepts a tapered exterior of the first fitting 109 and the second fitting 110 that are contained in the wall fittings 101. In one embodiment, the conduit coupler 102 includes a circular cavity 113 at the distal end that accepts a spring 106 and an end of electrical conduit 103.

In one embodiment, the electrical conduit 103 is polyvinyl chloride (PVC) electrical conduit. In one embodiment, the electrical conduit 103 is a metal electrical conduit. In one embodiment, the electrical conduit 103 is a polyvinylidene fluoride (PVDF) electrical conduit.

FIG. 14 is a block diagram illustrating an exemplary method 200 of using an exemplary electrical conduit coupling system. In step 201, the user inserts and secures two stud wire protectors into the pre-drilled holes in the adjacent studs. In step 202, the user inserts a spring into each of two conduit couplers. In step 203, the user inserts each end of a piece of electrical conduit into each of the two conduit couplers. Finally, in step 204, the user attaches each end of the electrical conduit assembly to the two stud wire protectors.

In the claims provided herein, the steps specified to be taken in a claimed method or process may be carried out in any order without departing from the principles of the invention, except when a temporal or operational sequence is explicitly defined by claim language. Recitation in a claim to the effect that first a step is performed then several other steps are performed shall be taken to mean that the first step is performed before any of the other steps, but the other steps may be performed in any sequence unless a sequence is further specified within the other steps. For example, claim elements that recite "first A, then B, C, and D, and lastly E" shall be construed to mean step A must be first, step E must be last, but steps B. C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate into this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

What is claimed is:

1. A stud wire protector comprising:
    a first hollow cylindrical member having a proximal end, a distal end, that extends through and not beyond a stud;
    a second hollow cylindrical member having a first fitting at a proximal end and a second fitting at a distal end;
    wherein the second hollow cylindrical member is configured to fit within the first hollow cylindrical member,
    wherein the first fitting is configured to insert within and to extend beyond the proximal end of the first hollow cylindrical member, and
    wherein second fitting is configured to extend beyond distal end of the first hollow cylindrical member, wherein the first fitting is a press-fitting.

2. A stud wire protector comprising:
    a first hollow cylindrical member having a proximal end, a distal end, that extends through and not beyond a stud;
    a second hollow cylindrical member having a first fitting at a proximal end and a second fitting at a distal end;
    wherein the second hollow cylindrical member is configured to fit within the first hollow cylindrical member,
    wherein the first fitting is configured to insert within and to extend beyond the proximal end of the first hollow cylindrical member, and
    wherein second fitting is configured to extend beyond distal end of the first hollow cylindrical member, wherein the first fitting is a tapered press-fitting.

3. A stud wire protector comprising:
    a first hollow cylindrical member having a proximal end, a distal end, that extends through and not beyond a stud;

a second hollow cylindrical member having a first fitting at a proximal end and a second fitting at a distal end;

wherein the second hollow cylindrical member is configured to fit within the first hollow cylindrical member, wherein the first fitting is configured to insert within and to extend beyond the proximal end of the first hollow cylindrical member, and wherein second fitting is configured to extend beyond distal end of the first hollow cylindrical member, wherein the second fitting is a tapered fitting.

4. A stud wire protector comprising:

a first hollow cylindrical member having a proximal end, a distal end, that extends through and not beyond a stud;

a second hollow cylindrical member having a first fitting at a proximal end and a second fitting at a distal end;

wherein the second hollow cylindrical member is configured to fit within the first hollow cylindrical member, wherein the first fitting is configured to insert within and to extend beyond the proximal end of the first hollow cylindrical member, and wherein second fitting is configured to extend beyond distal end of the first hollow cylindrical member, wherein the second hollow cylindrical member has one or more indentations around the circumference at the proximal end.

5. A stud wire protector comprising:

a first hollow cylindrical member having a proximal end, a distal end, extending through and not beyond a stud;

a second hollow cylindrical member having a first tapered press-fitting at a proximal end and a second tapered fitting at a distal end;

wherein the second hollow cylindrical member is configured to fit within the first hollow cylindrical member, wherein the first tapered press-fitting is configured to insert within and to extend beyond the proximal end of the first hollow cylindrical member, and wherein second tapered fitting is configured to extend beyond distal end of the first hollow cylindrical member.

6. The stud wire protector of claim 5, wherein the second hollow cylindrical member has one or more indentations around the circumference at the proximal end.

7. An electrical conduit coupling system comprising:

two or more stud wire protectors each independently comprising:

a first hollow cylindrical member having a proximal end, a distal end, and configured to extend through and not beyond a stud;

a second hollow cylindrical member having a first fitting at a proximal end and a second fitting at a distal end;

wherein the second hollow cylindrical member is configured to fit within the first hollow cylindrical member, wherein the first fitting is configured to insert within and to extend beyond the proximal end of the first hollow cylindrical member, wherein second fitting is configured to extend beyond distal end of the first hollow cylindrical member;

two or more conduit couplers each having a proximal end and a distal end, wherein the two or more conduit couplers are each independently configured at each proximal end to accept the first fitting and the second fitting, and wherein the two or more conduit couplers are configured at each distal end to accept a spring and an end of electrical conduit, and wherein the two or more conduit couplers each independently comprise a circular cavity at the distal end that accepts a spring and an end of electrical conduit.

8. The electrical conduit coupling system of claim 7, wherein the first fitting is a press-fitting.

9. The electrical conduit coupling system of claim 7, wherein the first fitting is a tapered press-fitting.

10. The electrical conduit coupling system of claim 7, wherein the second fitting is a tapered press-fitting.

11. The electrical conduit coupling system of claim 7, wherein the second hollow cylindrical member has one or more indentations around the circumference at the proximal end.

12. The electrical conduit coupling system of claim 7, wherein the two or more conduit couplers each independently comprise a tapered internal cavity at the proximal end that accepts a tapered exterior of the first fitting and the second fitting.

13. The electrical conduit coupling system of claim 7, wherein the two or more conduit couplers each independently comprise a circular cavity at the distal end that accepts a spring and an end of electrical conduit.

14. The electrical conduit coupling system of claim 7, wherein the electrical conduit is polyvinyl chloride (PVC) electrical conduit.

15. A polyvinyl chloride (PVC) electrical conduit coupling system comprising:

two or more stud wire protectors each independently comprising:

a first hollow cylindrical member having a proximal end, a distal end and configured to extend through and not beyond a stud;

a second hollow cylindrical member having a first press-fitting at a proximal end and a second fitting at a distal end;

wherein the second hollow cylindrical member is configured to fit within the first hollow cylindrical member, wherein the first press-fitting is configured to insert within and to extend beyond the proximal end of the first hollow cylindrical member, wherein second fitting is configured to extend beyond distal end of the first hollow cylindrical member;

two or more conduit couplers each having a proximal end and a distal end, wherein the two or more conduit couplers are each independently configured at each proximal end to accept the first press-fitting and the second fitting, and wherein the two or more conduit couplers are configured at each distal end to accept a spring and an end of polyvinyl chloride (PVC) electrical conduit.

16. The polyvinyl chloride (PVC) electrical conduit coupling system of claim 15, wherein the first press-fitting is a tapered press-fitting and the second fitting is a tapered fitting.

17. The polyvinyl chloride (PVC) electrical conduit coupling system of claim 15, wherein the second hollow cylindrical member has one or more indentations around the circumference at the proximal end.

18. The polyvinyl chloride (PVC) electrical conduit coupling system of claim 15, wherein the two or more conduit couplers each independently comprise a tapered internal cavity at the proximal end that accepts a tapered exterior of the first press-fitting and the second fitting.

19. The polyvinyl chloride (PVC) electrical conduit coupling system of claim 15, wherein the two or more conduit couplers each independently comprise a circular cavity at the distal end that accepts a spring and an end of polyvinyl chloride (PVC) electrical conduit.

\* \* \* \* \*